US010110529B2

United States Patent
Chinnapatlolla et al.

(10) Patent No.: US 10,110,529 B2
(45) Date of Patent: *Oct. 23, 2018

(54) SMART EMAIL ATTACHMENT SAVER

(71) Applicant: International Business Machines Corporation, Armonk, NY (US)

(72) Inventors: Anjil R. Chinnapatlolla, Bangalore (IN); Vijai Kalathur, Wappingers Falls, NY (US); Rajaram B. Krishnamurthy, Pleasant Valley, NY (US); Ajay Sood, Bangalore (IN); Srivatsan Venkatesan, Fishkill, NY (US)

(73) Assignee: International Business Machines, Armonk, NY (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/868,502

(22) Filed: Sep. 29, 2015

(65) Prior Publication Data

US 2017/0091250 A1 Mar. 30, 2017

(51) Int. Cl.
| | | |
|---|---|---|
| *G06F 15/16* | (2006.01) | |
| *H04L 12/58* | (2006.01) | |
| *G06F 17/30* | (2006.01) | |

(52) U.S. Cl.
CPC .......... *H04L 51/08* (2013.01); *G06F 17/3071* (2013.01); *H04L 51/04* (2013.01); *G06F 17/30707* (2013.01)

(58) Field of Classification Search
CPC ..... H04L 51/04; H04L 51/08; G06F 17/3071; G06F 17/30707
See application file for complete search history.

(56) References Cited

U.S. PATENT DOCUMENTS

| | | | |
|---|---|---|---|
| 7,155,481 B2 | 12/2006 | Prahlad et al. | |
| 7,257,639 B1 | 8/2007 | Li et al. | |
| 7,913,053 B1 | 3/2011 | Newland | |
| 8,458,194 B1 * | 6/2013 | Procopio | G06F 17/30705 707/749 |
| 8,458,269 B2 | 6/2013 | Friedman et al. | |
| 9,391,935 B1 * | 7/2016 | Gunda | H04L 51/08 |

(Continued)

OTHER PUBLICATIONS

Chinnapatlolla et al., "Confidence Score-Based Smart Email Attachment Saver", U.S. Appl. No. 14/868,780, filed Sep. 29, 2015, pp. 1-27.

(Continued)

*Primary Examiner* — Yves Dalencourt
(74) *Attorney, Agent, or Firm* — Gilbert Harmon, Jr.

(57) ABSTRACT

In an approach to save-to location selection, a computing device accesses a metadata file comprising a data table. The computing device successively checks the data table for entries that match a series of features of a file to be saved. If the computing device finds one or more matches, the computing device determines an associated save-to location. If the computing device does not find a match and has exhausted all of the series of features, the computing devices determines a default save-to location. The computing device receives a user selection based on or overriding the determination. The computing device updates the data table with information concerning each of the features of the file and information concerning the user selection.

17 Claims, 5 Drawing Sheets

(56) References Cited

U.S. PATENT DOCUMENTS

| | | |
|---|---|---|
| 2002/0184317 A1 | 12/2002 | Thankachan |
| 2003/0130993 A1* | 7/2003 | Mendelevitch ... G06F 17/30707 |
| 2004/0158607 A1 | 8/2004 | Coppinger et al. |
| 2005/0010593 A1* | 1/2005 | Fellenstein ....... G06F 17/30067 |
| 2006/0031309 A1 | 2/2006 | Luoffo et al. |
| 2009/0164506 A1 | 6/2009 | Barley et al. |

OTHER PUBLICATIONS

IBM Appendix P, list of patents and patent applications treated as related, Sep. 29, 2015, pp. 1-2.

* cited by examiner

SMART EMAIL ATTACHMENT SAVER

BACKGROUND OF THE INVENTION

The present invention relates generally to the field of email attachment management, and more particularly to selection of an email attachment save-to location.

When an email client saves an attachment associated with an email message, the save-to location is ordinarily a default location. Accordingly, any saved email attachments are typically stored in the same location regardless of any characteristics of the email or the attachment, such as, but not limited to, the sender, subject line, and filename.

SUMMARY

According to one embodiment of the present invention, a computer-implemented method for selecting a save-to location is provided. The computer-implemented method includes: accessing, by one or more processors, a metadata file comprising a data table; checking, by one or more processors, the data table for one or more entries that match one of a series of predefined features of a file to be saved, one feature at a time, successively, until a match is found or no match is found and all of the series of predefined features of the file have been exhausted; determining, if a match is found, by one or more processors, a save-to location associated with an entry in the data table that matches the one of the series of predefined features of the file; determining, if no match is found and all of the series of predefined features of the file have been exhausted, by one or more processors, a save-to location based on a default configuration; receiving, by one or more processors, a user selection based on or overriding the determined save-to location; and updating, by one or more processors, the data table with information concerning each predefined feature of the file and information concerning the user selection.

According to another embodiment of the present invention, a computer program product for selecting a save-to location is provided. The computer program product can include one or more computer readable storage media and program instructions stored on the one or more computer readable storage media, the program instructions comprising: program instructions to access a metadata file comprising a data table; program instructions to check the data table for one or more entries that match one of a series of predefined features of a file to be saved, one feature at a time, successively, until a match is found or no match is found and all of the series of predefined features of the file have been exhausted; program instructions to determine, if a match is found, a save-to location associated with an entry in the data table that matches the one of the series of predefined features of the file; program instructions to determine, if no match is found and all of the series of predefined features of the file have been exhausted, a save-to location based on a default configuration; program instructions to receive a user selection based on or overriding the determined save-to location; and program instructions to update the data table with information concerning each predefined feature of the file and information concerning the user selection.

According to another embodiment of the present invention, a computer system is provided. The computer system can include one or more processors; one or more computer readable storage media; and program instructions stored on the one or more computer readable storage media, the program instructions comprising: program instructions to access a metadata file comprising a data table; program instructions to check the data table for one or more entries that match one of a series of predefined features of a file to be saved, one feature at a time, successively, until a match is found or no match is found and all of the series of predefined features of the file have been exhausted; program instructions to determine, if a match is found, a save-to location associated with an entry in the data table that matches the one of the series of predefined features of the file; program instructions to determine, if no match is found and all of the series of predefined features of the file have been exhausted, a save-to location based on a default configuration; program instructions to receive a user selection based on or overriding the determined save-to location; and program instructions to update the data table with information concerning each predefined feature of the file and information concerning the user selection.

DETAILED DESCRIPTION

The present invention is an approach to attachment save-to location selection that facilitates smart attachment saving based on the analysis of data available to an email client. Embodiments described herein can provide a solution to, for example, a problem encountered when multiple parties edit and exchange a document in a series of email messages. A recipient of the various email attachments would likely want to save each version to the same location, which may not be the default location ordinarily selected by the email client. Embodiments of the present invention allow the email client to perform some simple checks in order to choose a smart save-to location, keeping the recipient from having to browse for an appropriate location every time that he or she saves an attachment.

Figure 1A:
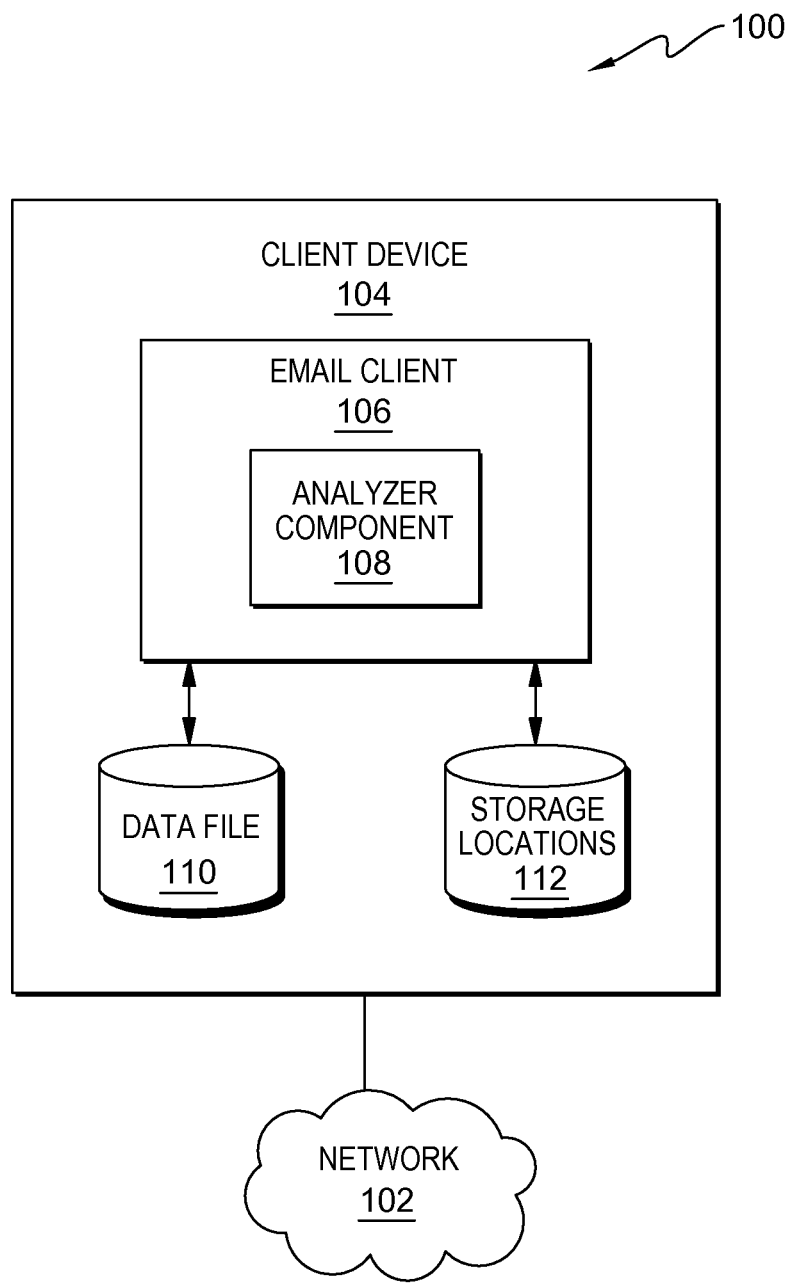
FIG. 1A-B are diagrams of a first computing environment and a second computing environment, respectively, in accordance with embodiments of the present invention.

FIG. 1A shows a block diagram of a computing environment 100, in accordance with an embodiment of the present invention. Computing environment 100 includes client device 104, which is interconnected with other devices (not shown) over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between client device 104 and other computing devices (not shown) within computing environment 100.

Client device 104 can be any programmable electronic device capable of executing machine-readable instructions and communicating with various components and devices (not shown), such as but not limited to an email server, within computing environment 100. For example, client device 104 can be a desktop computer, a laptop computer, a mobile device, or any other suitably configured device.

Client device 104 includes email client 106, analyzer component 108, data file 110, and storage locations 112.

Email client 106 can be any device or software configured to send and receive email and attachments and download these to client device 104. Email client 106 can be, for example but without limitation, Microsoft Outlook, Mozilla Thunderbird, Pegasus Mail, Windows Live Mail, or Lotus Notes.

Figure 1B:
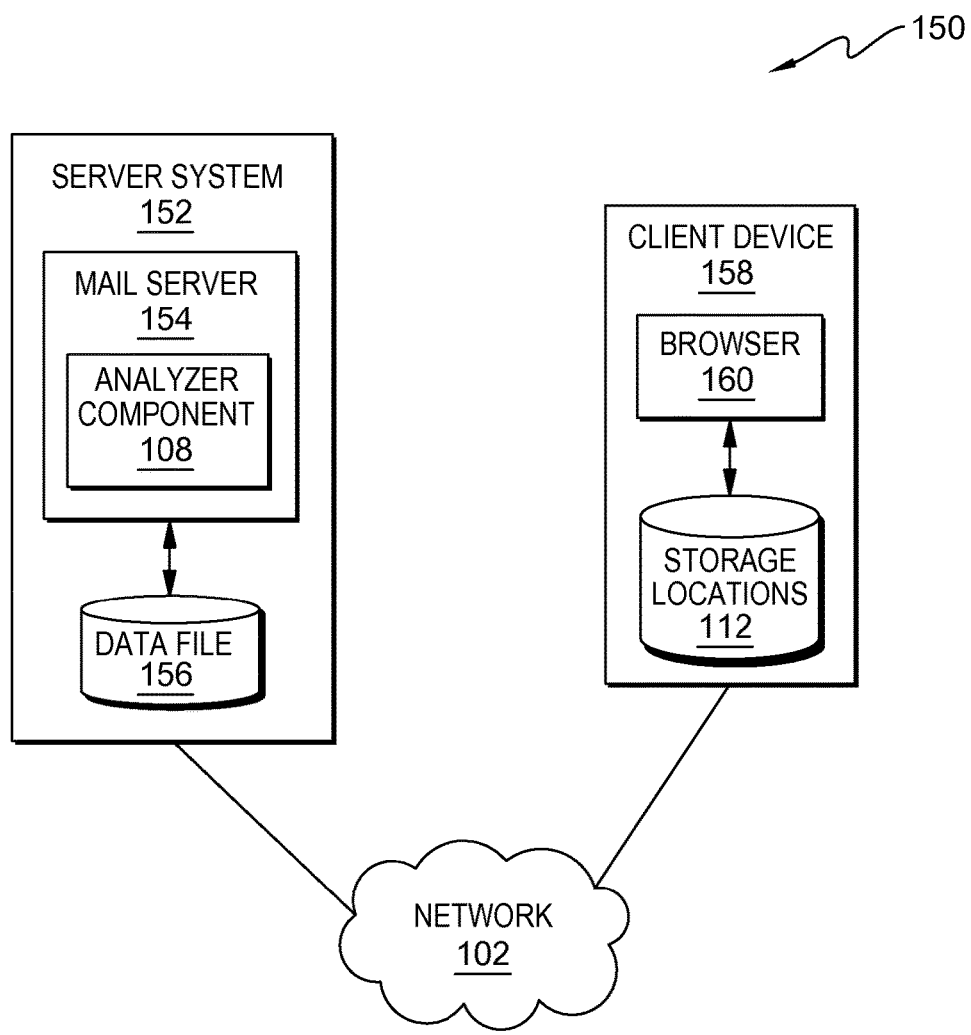
Figure 2A:
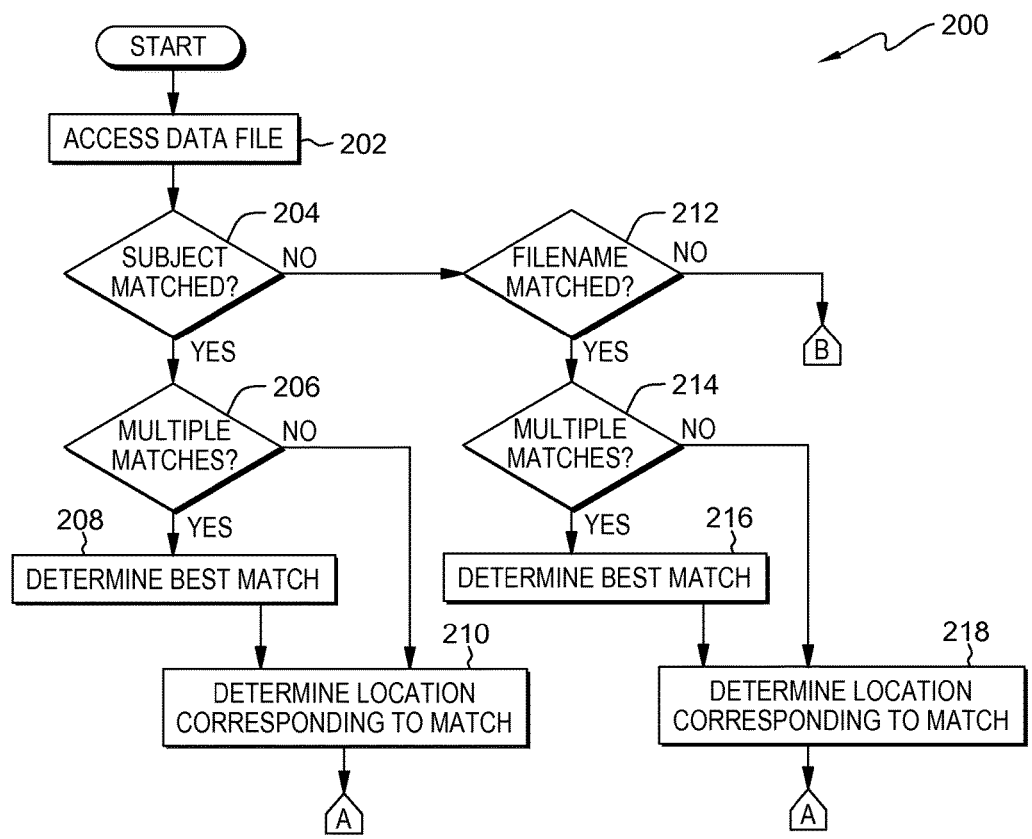
FIG. 2A-B is a flowchart depicting operational steps of a save-to location selection method, in accordance with an embodiment of the present invention.
Figure 2B:
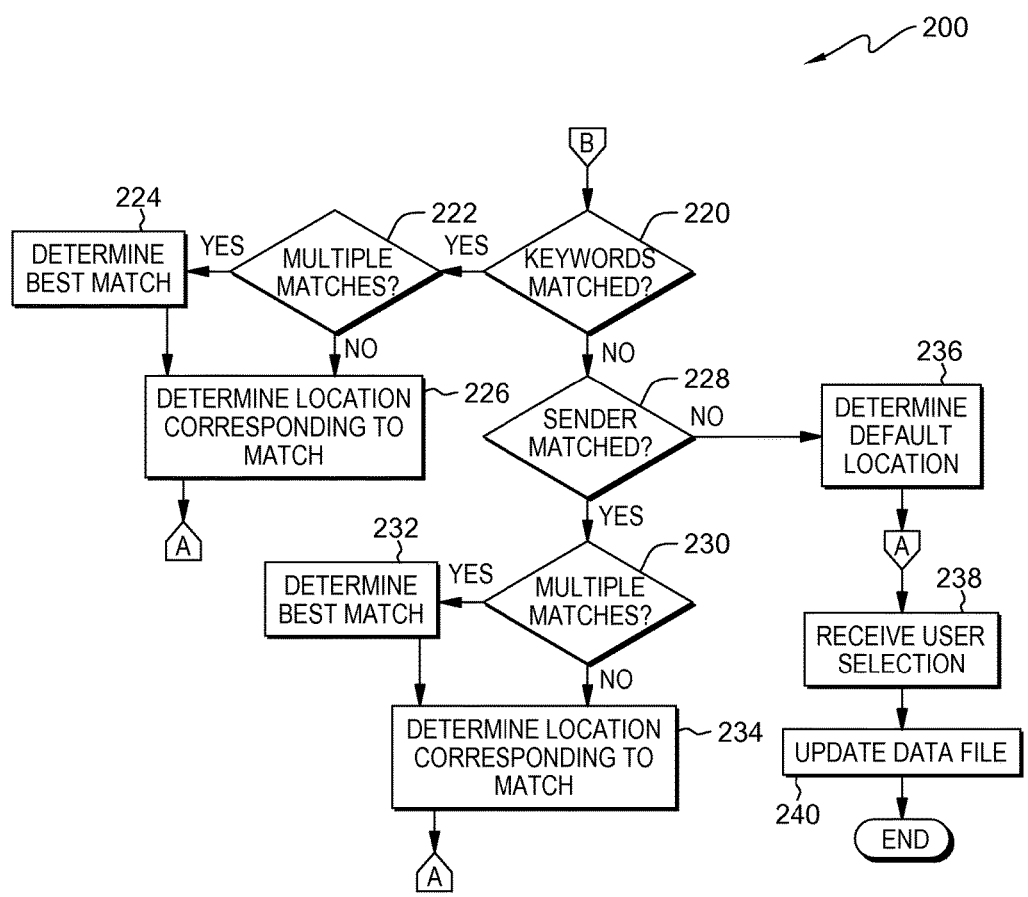

Analyzer component 108 performs steps of a save-to location selection method, as described herein with reference to FIG. 2A-B, for example, from a client device such as client device 104; from a server, as described herein with reference to FIG. 1B; or as a service deployed to the cloud; among other variations that will be appreciated by those skilled in the art. Analyzer component 108 performs checks and/or computations based on the contents of data file 110 in order to determine a smart save-to location. For example, analyzer component 108 can perform these steps in response to a user clicking a "Save Attachment" button in email client 106.

Data file 110 is a metadata file containing information concerning attachments previously saved to a location in storage locations 112. For example, data file 110 can contain a table (also referred to herein as a "data table") of information including but not limited to the subject line, attachment filename, keywords indicating the topic(s) of discussion, sender's email address, and save-to location of previously saved attachments. The keyword(s) in data file 110 can include, for example but without limitation, one or more of frequently occurring words and contextual keywords generated using cognitive computing services such as IBM Watson's Natural Language Classifier and Concept Insights services.

Storage locations 112 are the electronic storage locations to which an attachment can be saved after it is received by email client 106 (or by mail server 154 in computing environment 150, as described herein with reference to FIG. 1B). Storage locations 112 can be, for example, directories on client device 104.

FIG. 1B shows a block diagram of a computing environment 150, in accordance with another embodiment of the present invention. Computing environment 150 includes network 102, server system 152, and client device 158.

Server system 152 and client device 158 are interconnected over network 102. Server system 152 includes one or more server devices hosting an email service. Server system 152 includes mail server 154, analyzer component 108, and data file 156.

Mail server 154 stores email messages as part of a web-based email service, such as but not limited to the web-based email services provided by Gmail, Yahoo!, and AOL. A user of client device 158 can access the messages stored by mail server 154 using browser 160, as described herein.

Analogous to data file 110 in computing environment 150, data file 156 is a metadata file containing information concerning attachments previously saved to a location in storage locations 112, including but not limited to the subject line, attachment filename, keywords indicating the topic(s) of discussion, sender's email address, and save-to location of previously saved attachments. Data file 156 also includes information identifying client device 158.

Client device 158 is any programmable electronic device capable of executing machine-readable instructions; communicating with various components and devices within computing environment 150; and saving (storing) attachments received across network 102. For example, client device 158 can be a desktop computer, a laptop computer, a mobile device, or any other suitably configured device. Client device 158 includes browser 160 and storage locations 112.

Browser 160 is a web browser that allows a user of client device 158 to access messages stored by mail server 154 across network 102. Browser 160 can be, for example but without limitation, Mozilla Firefox, Internet Explorer, or Google Chrome.

FIG. 2A-B shows an example of operational steps of a save-to location selection method performed by analyzer component 108 in accordance with an embodiment of the present invention. It should be noted that the steps recited herein with respect to analyzer component 108 in computing environment 100 are analogous to the steps performed by analyzer component 108 in computing environment 150. Accordingly, email client 106 and mail server 154, and data file 110 and data file 156, have analogous functions in their respective environments.

In step 202, analyzer component 108 accesses data file 110 to analyze an associated data table. For example, analyzer component 108 generates an in-memory version of the attributes stored in the data table that correspond to the email message. In step 204, analyzer component 108 checks for entries in the data table that match the subject line of the email message. If analyzer component 108 finds a match in step 204, then in step 206, analyzer component 108 determines whether the table contains more than one match.

If analyzer component 108 determines that the table contains more than one match, then in step 208 analyzer component 108 determines the best match. Analyzer component 108 can determine the best match by a tiebreaker based on, for example, the most frequently used save-to location corresponding to the matches, and a comparison of other features of the email message and/or the attachment to other entries in the data table. For example, analyzer component 108 can determine the number of matches to which a particular save-to location corresponds, and, if two save-to locations correspond to an equal number of matches, perform an additional search for other matched features such as a filename, keyword(s), or sender's address in the data table. In step 210, analyzer component 108 determines the save-to location corresponding to the best match.

If analyzer component 108 does not determine that the table contains more than one match, then analyzer component 108 determines the save-to location corresponding to the unique match in step 210.

If analyzer component 108 does not find a match for the subject line in step 204, then in step 212, analyzer component 108 checks for entries in the data table that match a predefined percentage (e.g., 80%) of the filename. If analyzer component 108 finds a match in step 212, then in step 214, analyzer component 108 determines whether the table contains more than one match. If analyzer component 108 determines that the data table contains more than one match, then analyzer component 108 determines the best match by a tiebreaker, as previously described, in step 216 and determines the save-to location corresponding to the best match in step 218. If analyzer component 108 does not determine that the data table contains more than one match, then in step 218, analyzer component 108 determines the save-to location corresponding to the unique match.

If analyzer component 108 does not find a match in step 212, then in step 220, analyzer component 108 checks for entries in the data table that match one or more keywords associated with the email and/or the attachment. If analyzer component 108 finds a match in step 220, then in step 222, analyzer component 108 determines whether the table contains more than one match. If analyzer component 108 determines that the data table contains more than one match, then analyzer component 108 determines the best match by a tiebreaker, as previously described, in step 224 and determines the save-to location corresponding to the best match in step 226. If analyzer component 108 does not determine that the data table contains more than one match, then in step 226, analyzer component 108 determines the save-to location corresponding to the unique match.

If analyzer component 108 does not find a match for the keywords in step 220, then in step 228, analyzer component 108 checks for entries in the data table that match the email address of the sender. If analyzer component 108 finds a match in step 228, then in step 230, analyzer component 108 determines whether the table contains more than one match. If analyzer component 108 determines that the data table contains more than one match, then analyzer component 108 determines the best match by a tiebreaker, as previously described, in step 232 and determines the save-to location corresponding to the best match in step 234. If analyzer component 108 does not determine that the data table contains more than one match, then in step 234, analyzer component 108 determines the save-to location corresponding to the unique match.

If analyzer component 108 does not find a match in step 228, then in step 236, analyzer component 108 determines a save-to location based on a default configuration.

In step 238, analyzer component 108 receives a user selection of a save-to location, which can be the save-to location determined in, for example, step 210, step 218, step 226, step 234, or step 236, or a different save-to location in storage locations 112 that the user prefers, which overrides the determination.

In step 240, analyzer component 108 updates data file 110 with a new entry populating all attributes of the saved attachment, including but not limited to the subject, filename, one or more keywords, sender's email address, and user selection.

Among other possible embodiments apparent to persons skilled in the art, it should be noted that the steps described above with reference to FIG. 2A-B can be modified to allow for smart email attachment creation. By matching features such as, but not limited to, the subject line of and one or more keywords contained in a newly composed email message to entries in data file 110, analyzer component 108 can determine where in storage locations 112 a user of client device 104 likely wishes to navigate to select an email attachment.

Other embodiments of the steps described above with reference to FIG. 2A-B can be modified to allow for smart save-to location selection for non-attachment files, such as files downloaded from websites on the Internet. For example, analyzer component 108 can match different features, such as but not limited to the domain, the name of the file, the file type, and one or more keywords, such as but not limited to one or more of frequently occurring words and contextual keywords generated using cognitive computing services such as IBM Watson's Natural Language Classifier and Concept Insights services, to information in data file 110 in order to select a save-to location in storage locations 112.

Figure 3:
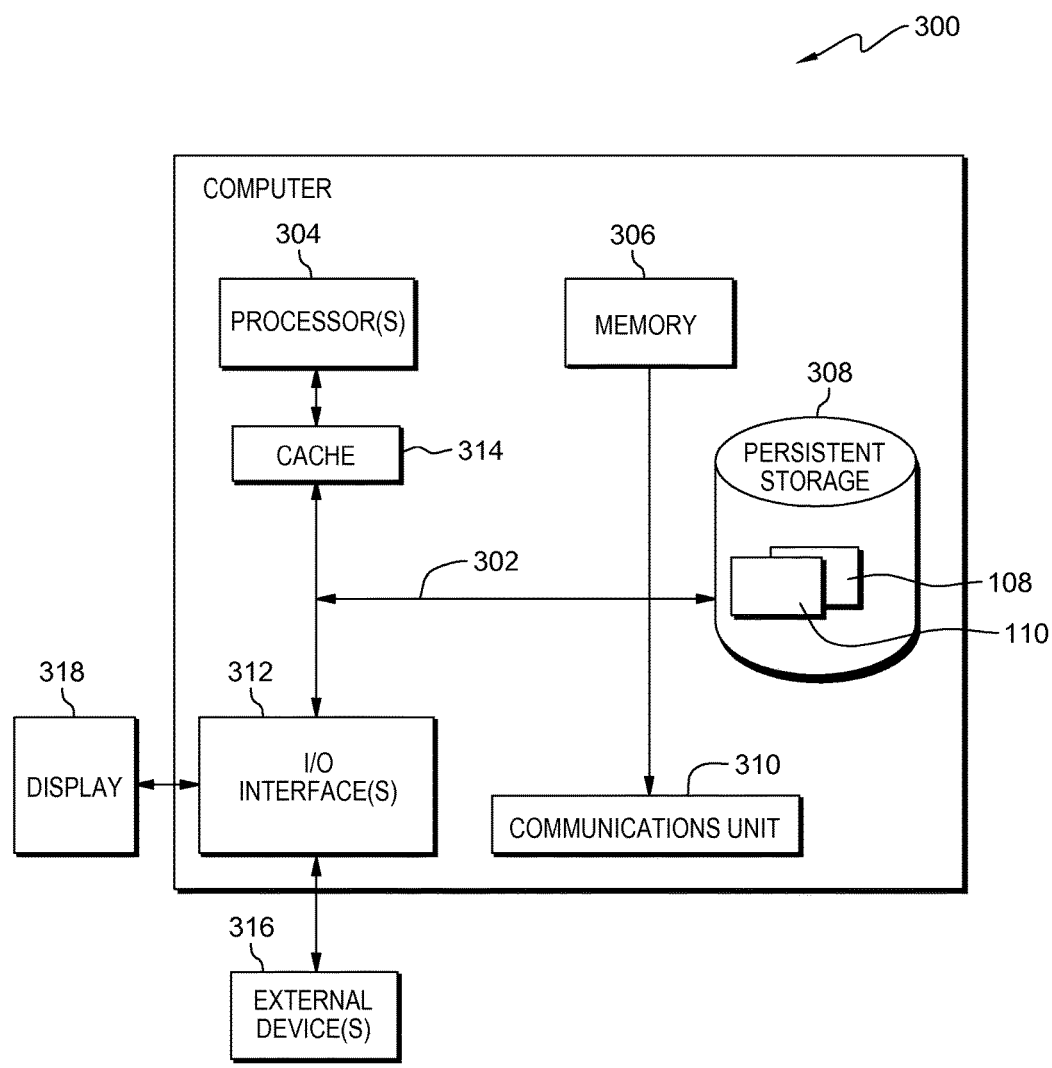
FIG. 3 is a block diagram of internal and external components of a client device and a server device in the computing environments of FIG. 1A and FIG. 1B, respectively, in accordance with embodiments of the present invention.

FIG. 3 depicts a block diagram 300 of components of client device 104 or server system 152, referred to collectively here as client device 104 in the interest of simplicity, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Client device 104 includes communications fabric 302, which provides communications between computer processor(s) 304, memory 306, persistent storage 308, communications unit 310, and input/output (I/O) interface(s) 312, and cache 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) and cache memory 314. In general, memory 306 can include any suitable volatile or non-volatile computer readable storage media. Cache 314 is a fast memory that enhances the performance of computer processor(s) 304 by holding recently accessed data, and data near accessed data, from memory 306.

Analyzer component 108 and data file 110 (data file 156 in computing environment 150) are stored in persistent storage 308 for execution and/or access by one or more of the respective computer processors 304 via one or more memories of memory 406. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. Communications unit 310 can include one or more network interface cards. Communications unit 310 can provide communications through the use of either or both physical and wireless communications links. Analyzer component 108 can be downloaded to persistent storage 308 through communications unit 310.

I/O interface(s) 312 allows for input and output of data with other devices that may be connected to client device 104. For example, I/O interface 312 can provide a connection to external devices 316 such as a keyboard, keypad, a touch screen, and/or some other suitable input device. External devices 316 can also include portable computer readable storage media such as, for example, thumb drives, portable optical or magnetic disks, and memory cards. Software and data used to practice embodiments of the present invention, e.g., analyzer component 108 and data 110 (data file 156 in computing environment 150), can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a touchscreen.

It should be noted that, in another exemplary embodiment of the present invention, a service provider can offer to provide the smart email attachment saver functionality described above with reference to FIG. 2A-B on a subscription, advertising, and/or fee basis. The service provider can, for example but without limitation, create, maintain, and support, a computer infrastructure that performs the processes of the present invention for one or more consumers. In return, the service provider can receive payment from the consumer(s) under a subscription and/or fee arrangement and/or the service provider can receive payment from the sale of advertising content to one or more third parties.

In still another embodiment, the invention provides a computer-implemented method for deploying a smart email attachment saver in a networked computing environment. According to this embodiment, a computer infrastructure, such as client device 104 (FIG. 3), can be provided and one or more systems for performing the processes of the invention can be obtained (e.g., created, purchased, used, modified, etc.) and deployed to the computer infrastructure. To this extent, the deployment of a system can comprise one or more of installing program code on a computing device, such as client device 104, from a computer-readable medium; adding one or more computing devices to a computing infrastructure; and incorporating and/or modifying one or more existing systems of the computer infrastructure to enable the computer infrastructure to perform the processes of the present invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for selecting a save-to location, the computer-implemented method comprising:
   accessing, by one or more processors, a metadata file comprising a data table;
   checking, by one or more processors, the data table for one or more entries that match one of a series of predefined features of a file to be saved, one feature at a time, successively, until a plurality of matches are found or no match is found and all of the series of predefined features of the file have been exhausted;
   determining, if a plurality of matches are found, by one or more processors, a save-to location associated with an entry in the data table that matches the one of the series of predefined features of the file, wherein the save-to location is determined by a tiebreaker;
   determining, if no match is found and all of the series of predefined features of the file have been exhausted, by one or more processors, a save-to location based on a default configuration;
   receiving, by one or more processors, a user selection based on the determined save-to location; and
   updating, by one or more processors, the data table with information concerning each predefined feature of the file and information concerning the user selection.

2. The computer-implemented method of claim 1, wherein the file to be saved is an email attachment.

3. The computer-implemented method of claim 2, wherein the series of predefined features comprises a subject line, a filename, one or more keywords, and an address of a sender.

4. The computer-implemented method of claim 3, wherein keywords comprise contextual keywords generated based on cognitive computing methods.

5. The computer-implemented method of claim 1, wherein the file to be saved is not an email attachment and the series of predefined features comprises a domain, a filename, a file type, and one or more keywords generated based on cognitive computing methods.

6. The computer-implemented method of claim 1, wherein the tiebreaker comprises a determination of the most frequently used save-to location associated with the more than one matches.

7. A computer program product for selecting a save-to location, the computer program product comprising:
   one or more computer readable storage media and program instructions stored on the one or more computer readable storage media, the program instructions comprising:
   program instructions to access a metadata file comprising a data table;
   program instructions to check the data table for one or more entries that match one of a series of predefined features of a file to be saved, one feature at a time, successively, until a plurality of matches are found or no match is found and all of the series of predefined features of the file have been exhausted;
   program instructions to determine, if a plurality of matches are found, a save-to location associated with an entry in the data table that matches the one of the series of predefined features of the file, wherein the save-to location is determined by a tiebreaker;
   program instructions to determine, if no match is found and all of the series of predefined features of the file have been exhausted, a save-to location based on a default configuration;
   program instructions to receive a user selection based on the determined save-to location; and
   program instructions to update the data table with information concerning each predefined feature of the file and information concerning the user selection.

8. The computer program product of claim 7, wherein the file to be saved is an email attachment.

9. The computer program product of claim 8, wherein the series of predefined features comprises a subject line, a filename, one or more keywords, and an address of a sender.

10. The computer program product of claim 9, wherein keywords comprise contextual keywords generated based on cognitive computing methods.

11. The computer program product of claim 7, wherein the file to be saved is not an email attachment and the series of predefined features comprises a domain, a filename, a file type, and one or more keywords generated based on cognitive computing methods.

12. The computer program product of claim 7, wherein the tiebreaker comprises a determination of the most frequently used save-to location associated with the more than one matches.

13. A computer system comprising:
   one or more processors;
   one or more computer readable storage media; and
   program instructions stored on the one or more computer readable storage media, the program instructions comprising:
   program instructions to access a metadata file comprising a data table;
   program instructions to check the data table for one or more entries that match one of a series of predefined features of a file to be saved, one feature at a time, successively, until a plurality of matches are found or no match is found and all of the series of predefined features of the file have been exhausted;
   program instructions to determine, if a plurality of matches are found, a save-to location associated with an entry in the data table that matches the one of the series of predefined features of the file, wherein the save-to location is determined by a tiebreaker;

program instructions to determine, if no match is found and all of the series of predefined features of the file have been exhausted, a save-to location based on a default configuration;

program instructions to receive a user selection based on the determined save-to location; and program instructions to update the data table with information concerning each predefined feature of the file and information concerning the user selection.

14. The computer system of claim 13, wherein the file to be saved is an email attachment.

15. The computer system of claim 14, wherein the series of predefined features comprises a subject line, a filename, one or more keywords, and an address of a sender.

16. The computer system of claim 15, wherein keywords comprise contextual keywords generated based on cognitive computing methods.

17. The computer system of claim 13, wherein the file to be saved is not an email attachment and the series of predefined features comprises a domain, a filename, a file type, and one or more keywords generated based on cognitive computing methods.

* * * * *